(12) United States Patent
Fink et al.

(10) Patent No.: US 11,783,546 B2
(45) Date of Patent: Oct. 10, 2023

(54) LAYERED 3-D IMAGES FOR AUGMENTED REALITY PROCESSING

(71) Applicant: STREEM, INC., Portland, OR (US)

(72) Inventors: Ryan R. Fink, Vancouver, WA (US); Sean M. Adkinson, North Plains, OR (US)

(73) Assignee: STREEM, LLC, Portland, OR (US)

( * ) Notice: Subject to any disclaimer, the term of this patent is extended or adjusted under 35 U.S.C. 154(b) by 0 days.

(21) Appl. No.: 16/222,659

(22) Filed: Dec. 17, 2018

(65) Prior Publication Data

US 2019/0188919 A1    Jun. 20, 2019

Related U.S. Application Data

(60) Provisional application No. 62/607,261, filed on Dec. 18, 2017.

(51) Int. Cl.
```
G06T 19/00    (2011.01)
G06T 7/50     (2017.01)
G11B 27/031   (2006.01)
G11B 27/30    (2006.01)
```

(52) U.S. Cl.
CPC ............ *G06T 19/006* (2013.01); *G06T 7/50* (2017.01); *G06T 2207/10016* (2013.01); *G06T 2207/10028* (2013.01); *G11B 27/031* (2013.01); *G11B 27/3081* (2013.01)

(58) Field of Classification Search
None
See application file for complete search history.

(56) References Cited

U.S. PATENT DOCUMENTS

| | | | | |
|---|---|---|---|---|
| 2013/0307875 A1* | 11/2013 | Anderson | ............. | G06T 19/006 345/633 |
| 2016/0379415 A1* | 12/2016 | Espeset | ..................... | G06T 7/20 345/633 |
| 2017/0098312 A1* | 4/2017 | Souchard | ............. | G02B 27/017 |
| 2017/0180652 A1* | 6/2017 | Baca | .................. | H04N 5/2226 |
| 2018/0350146 A1* | 12/2018 | Gervasio | ................. | G06T 17/00 |

* cited by examiner

*Primary Examiner* — Yingchun He
(74) *Attorney, Agent, or Firm* — Schwabe Williamson & Wyatt

(57) ABSTRACT

A method for creating and storing a captured image and associated spatial data and augmented reality (AR) data in a file that allows subsequent manipulation and processing of AR objects is disclosed. In embodiments, one or more frames are extracted from a video stream, along with spatial information about the camera capturing the video stream. The one or more frames are analyzed in conjunction with the spatial information to calculate a point cloud of depth data. The one or more frames are stored in a file in a first layer, and the point cloud is stored in the file in a second layer. In some embodiments, one or more AR objects are stored in a third layer.

10 Claims, 5 Drawing Sheets

NON-TRANSITORY COMPUTER-READABLE STORAGE MEDIUM
602

PROGRAMMING INSTRUCTIONS 604,
CONFIGURED TO CAUSE A DEVICE, IN RESPONSE TO EXECUTION
OF THE PROGRAMMING INSTRUCTIONS, TO PRACTICE (ASPECTS
OF) EMBODIMENTS OF THE PROCESS(ES) DESCRIBED
THROUGHOUT THIS DISCLOSURE.

FIG. 5

LAYERED 3-D IMAGES FOR AUGMENTED REALITY PROCESSING

RELATED APPLICATIONS

The present disclosure claims priority to U.S. Provisional Application Ser. No. 62/607,261, filed 18 Dec. 2017, the contents of which are hereby incorporated by reference as if fully set forth herein.

TECHNICAL FIELD

The present disclosure relates to the field of augmented reality (AR), and specifically to a layered file structure for preserving AR-related and Machine Learning (ML)-related information.

BACKGROUND

Various devices today, such as smartphones and tablets, are capable of supporting augmented reality (AR). Broadly, AR includes the superimposition of virtual and computer-generated objects over a video stream of a user's surroundings. For example, a person may initiate a video stream of their surroundings on a smartphone, and then use software to add objects to the video stream, making it appear as if the virtual objects were placed within the real world. In various AR implementations, the video stream or feed from a camera, typically the device's on-board camera, may be processed using various algorithms to detect features in the video, such as planes, surfaces, faces, and other recognizable shapes. These detected features may then be used as anchor or reference points for the placement of virtual objects, so that the objects appear stationary with respect to other objects in the scene as the user moves the camera around. Feature detection may be augmented with depth sensors or motion information captured from motion sensors, such as a MEMS gyroscope and accelerometers, which can instruct AR software as to how the camera is moving, e.g. tilt, pan, rise, fall. This motion information may be combined with detected features and anchor points to provide a more accurate understanding of where the camera is moving in relation to the captured scene, and thus allow virtual objects placed in the video stream to more realistically appear and interact with real objects in the video stream.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 5 is a block diagram of a computer-readable storage medium that can be used to implement some of the components of the system or methods disclosed herein, according to various embodiments.

DETAILED DESCRIPTION OF DISCLOSED EMBODIMENTS

Figure 1:
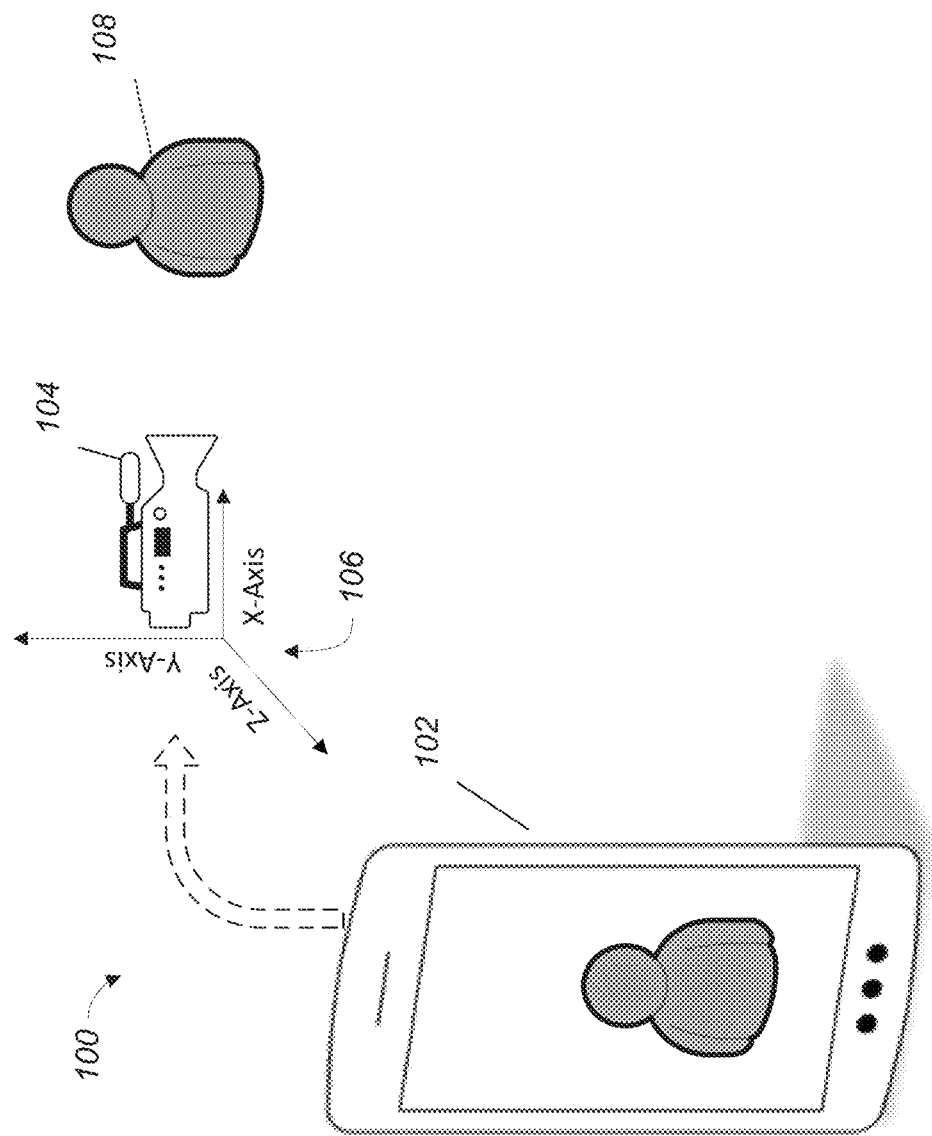
FIG. 1 illustrates a block diagram of the components of an example system for capturing an image and saving to a layered the structure including AR data, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Capturing an AR image, such as may be generated by initiating a screen capture on a smartphone running an augmented reality program, typically results in a conventional two-dimensional image, similar to what would be taken by a camera. Where the underlying image of the camera's field of view is blocked or obscured by an overlaid virtual or AR object, that portion of the image data is lost, as the captured image is comparable to the result obtained if the virtual objects were real and actually placed in the captured scene.

The usefulness of a captured AR image may be increased, including possible applications for post-processing of the image, if information can also be captured and stored that provides 3-D and spatial information, thus allowing the original captured AR scene to be recreated without loss of underlying image data. By storing the AR data, subsequent processing of the image can include the recreation or addition of AR information, such as virtual objects. Some embodiments may provide other post-processing possibilities, including analysis and measurements of objects within the underlying image.

FIG. 1 illustrates an example system 100 that may embody capture and creation of a layered data structure for an image that includes AR data. System 100 may include a device 102. In the depicted embodiment of FIG. 1, device 102 is a smartphone, which may be implemented as a computer device 500, described herein. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein. Device 102 further may include a camera 104 and a spatial position sensor 106 (depicted by a series of axes), which provides information about the spatial position of camera 104. It will be understood that camera 104 and spatial position sensor 106 may be contained within the body of device 102. Camera 104 is used to capture the surrounding environment of device 102, and by extension, the user. The environment may include three-dimensional objects 108.

Camera 104 may be any camera that can provide a suitable video stream for the intended purpose of device 102. Where device 102 is implemented as a smartphone or tablet, camera 104 may be a built-in camera. In other embodiments, such as where consumer device is a laptop, camera 106 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and device 102.

Spatial position sensor 106 may be configured to provide positional information about camera 104, such as camera 104's pan and tilt. Other measured positional vectors may include camera movements, such as the camera rising or falling, or moving laterally. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera, including but not limited to depth sensors 104.

Figure 2:
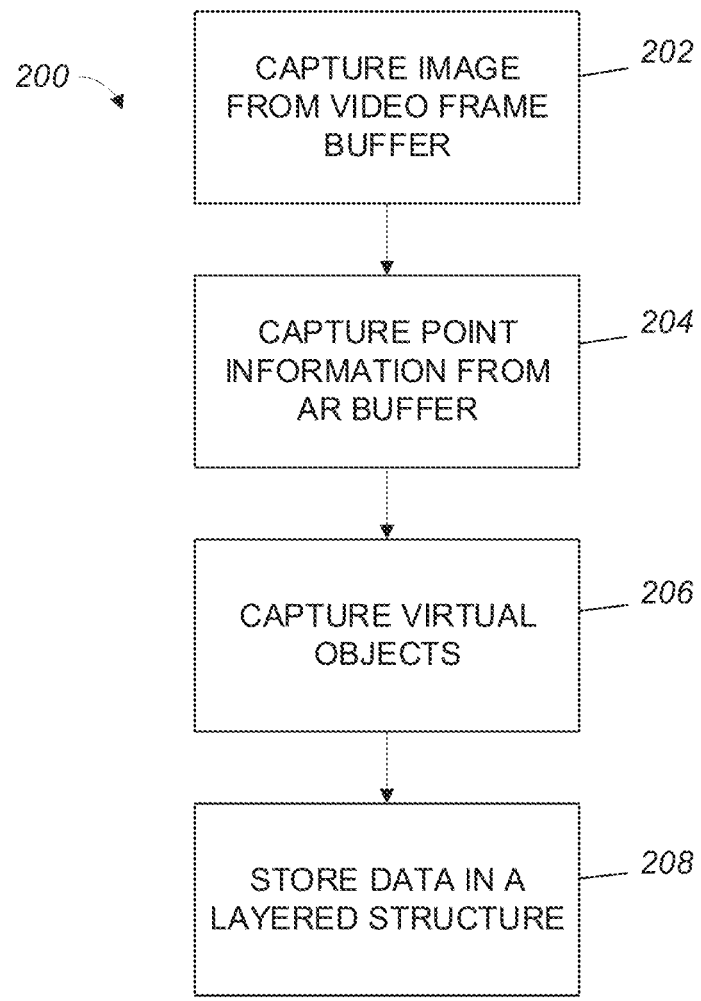
FIG. 2 is a flowchart of an example method for capturing an image and saving to a layered file including AR data that may be implemented by the system of FIG. 1, according to various embodiments.

Turning to FIG. 2, an example method 200 for capturing an image and storing it in a layered file or structure with AR data is depicted. Method 200 may be carried out by device 102 equipped with a camera 104 and spatial position sensor 106, in whole or in part. In block 202, an image is obtained from the frame buffer of a camera, e.g. camera 104, while the camera is supplying a video stream. The video stream may have specifications that vary depending upon the nature and type of the device carrying out method 200 and/or the associated camera. Some video streams may be captured in standard definition ("SD", generally around 480 scan lines, e.g. 480p, with a 2D resolution of approximately 720×480), high definition ("HD", 720p or 1080p, corresponding to resolutions of 1280×720 and 1920×1080, respectively), or higher definitions such as 4K or Ultra HD (also known as Quad HD, QHD, or 2160p, corresponding to a resolution of 3840×2160). Further developments may provide enhanced video resolutions, such as 8K, or even 3D captures in the future.

Each video stream may be comprised of a progressive series of video frames, typically captured at a rate of approximately 30 to 60 frames per second. Other implementations may vary the frame rate. Grabbing a frame from the frame buffer may comprise copying out or otherwise storing one of the frames captured from the video stream.

While the video stream is being captured or otherwise recorded, in embodiments a spatial position sensor, such as spatial position sensor 106, captures spatial information to relate to the spatial position of the camera. Likewise, in some embodiments, the video stream is processed, including performing detection of objects and surfaces, to establish anchor points. This processing may be carried out by software and/or hardware on device 102. Detection of anchor points and other relevant data from the video stream and spatial position information may result in a feature point cloud, with specific points being identified in the video stream, and by extension, each frame of the video stream. Where the points correspond to particular detected locations on various recognized shapes, the points can be repeatably identified between frames, even as the capturing camera moves, changing its perspective and view.

Still further, according to some embodiments, multiple temporally adjacent frames may be used to extrapolate depth approximations of various points in the video stream. For an example with device 102, camera 104 captures a video stream of a table. Device 102 is configured to detect the surface of the table and its respective edges. As device 102 is moved slightly across multiple frames, device 102 can analyze and detect slight differences in the shape appearance of the detected table as well as shifts in position of the identified feature points. These differences can be used to calculate a relative size of the table, and thus the position in 3D space of the various feature points. From this position information, distances and depths may further be extrapolated. These calculations may be enhanced and supplemented by spatial information from spatial position sensor 106, including possibly determining absolute positions and depths for identified feature points. The final result is a plurality of feature points where each feature point is known in 3D space for its distance from at least the camera or a common origin point, and with this information, the distance and depth from other features in a given frame of the video stream.

In other embodiments, depth data, and so one or more depth points in the captured scene, may be directly measured with one or more sensors, such as a stereoscopic camera, rangefinder, LIDAR, or other suitable device for capturing depth points. Such a sensor may be incorporated into device 102, such as part of camera 104 or spatial position sensor 106, in various embodiments. Directly captured depth data may be used directly as part of the point cloud information, or may be used as a cross-check or supplement with other methods of determining depth data, depending upon the needs of a given embodiment.

In block 204, this feature and/or depth point information is captured or computed substantially contemporaneously with the capture of an image (or frame) from the video stream, which may allow the feature point information to be immediately correlated to the captured image. In some example embodiments, the feature and/or depth point information is captured from the software and/or hardware, e.g. on device 102, that is computing the feature points. In embodiments that employ a depth sensor, as discussed herein, the sensed depth information may comprise at least part of the depth point information, and may be captured substantially contemporaneously with the image capture. In embodiments, where a frame is extracted from the video stream at a later time, e.g. from a saved video stream, each frame in the video stream may be tagged with a unique key that is also tagged to depth data captured contemporaneously, to allow for later correlation of each frame with its associated depth data.

Along with identified feature/depth points, feature/depth point information may also include the associated spatial information from a spatial position sensor, e.g. spatial position sensor 106. As with depth data (if directly captured or measured), information from a spatial position sensor may be stored with unique keys, to allow subsequent correlation of each frame of the video stream with contemporaneously captured spatial information. In some embodiments, depth points are not captured directly, but instead extrapolated by software after capture using techniques such as photogrammetry, correlation with spatial position information, or other known suitable techniques for determining depth points. It will be understood that where depth points are extrapolated following capture, they are easily or inherently correlated with the frame or frames from which they are extracted. Furthermore, feature points contemporaneous with other frames before and/or after the captured image may also be captured, and may be used to further enhance the feature points captured and associated with the captured image. Feature/depth points may also be considered a type of anchor point, which provide a fixed physical point of reference relative to other objects in the frame. Virtual/AR objects positioned with reference to one or more anchor points thus appear as part of the scene captured by the camera.

Once a frame and its associated feature point information are stored, any superimposed virtual objects may be recorded and captured in block 206. This information may include the nature and dimensions of the virtual object, along with the object's spatial position within the captured frame of the video stream. The object's position may be defined with respect to one or more points, such as anchor points or points that can serve as anchor points, in the feature point cloud (e.g. the points the object is most proximate to, and to what distance and direction), or another reference point within the frame.

Finally, in block 208, the captured frame, feature point cloud and any other associated spatial information, and any virtual objects may be stored in a layered data structure. It should be appreciated by a person having skill in the relevant art that the layered data structure is a logical construct indicating that each data type (captured frame, feature point cloud/spatial data, and virtual objects) is stored discrete from the other data types, such that no data from any respective data type is lost or modified via the other data types. The actual mechanics of how the data is stored and associated file type or types may be of any type suitable for its intended subsequent use. Some embodiments may employ multiple related files, each file containing the data of one or more layers. In other embodiments, the file or files may include other layers with other relevant data. In still other embodiments, the data may be stored in a database or related databases, or in or using any other suitable storage mechanism that allows each layer of data to be stored and individually retrieved without loss of data from the other layers. Further still, some embodiments may mix or intermingle data from each layer in such a fashion that the data from each layer can be subsequently extracted, separated, and recreated.

A person skilled in the relevant art will understand that the layered data structure may be stored locally, on storage equipped to device 102, and/or on storage that is remote to device 102, such as a network-accessible file server or network attached storage.

The end result is, in embodiments, a captured still image from the video stream that also includes a point cloud (including one or more anchor points), and may also include one or more AR objects. It will be appreciated that, with the storage of a point cloud including depth data, the one or more AR objects can be manipulated, modified, or removed, or other AR objects can be added in, all within a simulated 3D space based upon the stored point cloud. With the addition of depth information and/or anchor points, in some embodiments, the captured image may be useful for making physical measurements in three dimensions.

In some further embodiments, multiple frames or sequences of frames may be captured to form a video clip with associated spatial information, which can further include one or more AR objects. As with the captured still image, the one or more AR objects can, in some embodiments, be manipulated by modification, movement (such as rotations, translations, and scaling, much as an actual physical object might be manipulated), removal, or placement of new images.

Figure 3:
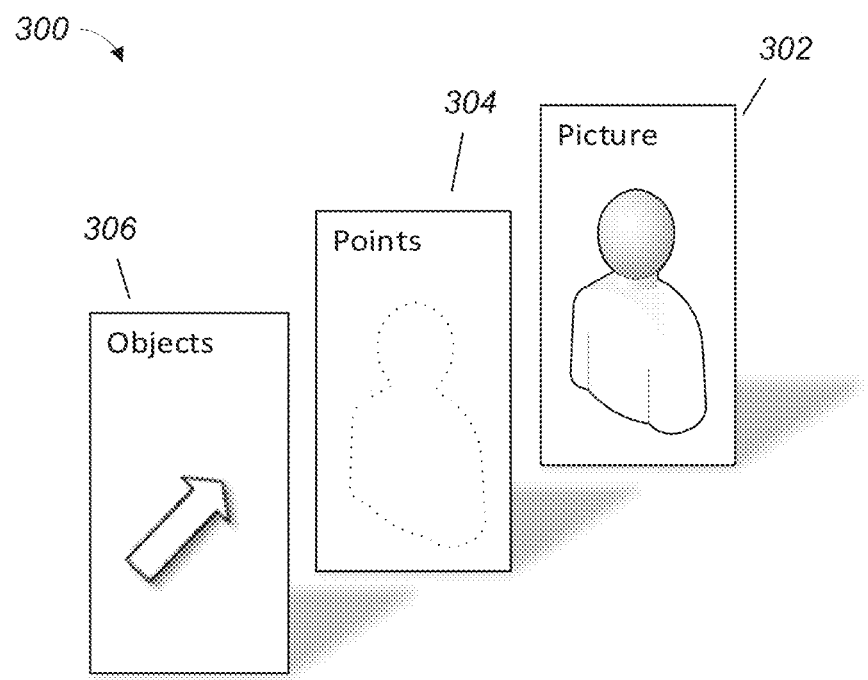
FIG. 3 depicts the various layers of a layered image file that may be the result of e method in FIG. 2, according to various embodiments.

Turning to FIG. 3, one possible embodiment of the file structure 300 is depicted. An initial layer 302 may comprise the captured figure from block 202 of method 200. The captured figure may be of any image type now known or later developed that is suitable for the intended purposes of the captured figure. Formats may include bitmap, GIF, PNG, JPEG, JPEG 2000, or other similar image storage types. The x,y dimensions of the captured frame may define a particular viewpoint for subsequent 3D approximation construction and placement of virtual objects.

Layer 304 may comprise the feature point cloud and associated spatial information, which corresponds to detected features within the captured frame and extrapolated from the surrounding frames in the video stream. As will be understood, feature points may include anchor points, or points otherwise useful as anchor points. This information may logically overlay upon image layer 302, to provide depth information and anchor points for the placement of virtual objects. The format for layer 304 may depend upon the nature of the information, and so may be highly variable. Any suitable file format capable of reliably storing the feature point cloud and associated spatial information may be employed. Each point in the feature point cloud may identify in a 3D space, and may include X and Y coordinates within the picture image, as well as depth information, which may be represented by a Z coordinate. By employing a Z coordinate, a 3D approximation of the captured frame can be constructed in which virtual objects may be placed. Although the depiction of the point cloud of layer 304 in FIG. 3 shows an approximate outline of the image in the capture frame depicted in layer 302, it will be understood by a person skilled in the relevant art that the feature point cloud may comprise one or more points extracted from seemingly random places within the captured frame; essentially, any place in the frame where a feature point that can be identified across frames may be created as a feature point. This may result in a point cloud that does not necessarily bear resemblance to its underlying image.

In embodiments where layer 302 is captured as a still image, the various points of point cloud layer 304 may be defined in terms of X and Y pixel locations within layer 302, with an added depth channel or vector for each point in layer 304. In embodiments where layer 302 is a video dip, point cloud layer 304 may be correlated to each separate frame of the video dip, with the X, Y, and Z (depth) values potentially changing with each frame relative to how the point of view of each frame changes. Thus, the X, Y, and Z values will change to track the positional changes in each frame of the various physical objects used to initially determine the various points in the point cloud.

Layer 306, finally, may comprise information about any overlaid virtual objects from the video stream. In the depiction of layer 306, an arrow is shown. The information may include the position, shape, size and orientation of the shape within the 3D approximation that may be constructed from the layer 304 information. Although only a single object is depicted, a plurality of objects may be stored in layer 306, including for objects that only partially may be visible from the view defined by the captured frame. Further, layer 306 may be empty where the captured frame has no virtual objects in view, or no virtual objects have been placed. Any virtual objects may be positioned with reference to one or more points in point cloud layer 304, acting as anchor points. Thus, a captured frame with AR objects may be rendered upon viewing first by determining the virtual object's position with respect to any anchor points, and then using the anchor point locations relative to the image layer 302 combined with information about the virtual object (size, shape, orientation) to render the virtual object onto layer 302 for display.

With the separate layers of captured information, file structure 300 may provide the ability to reconstruct the original AR scene at the time of capture, while maintaining all "clean" image data as originally captured by camera 104. This reconstruction may be useful for future review and/or training purposes, depending upon the intended purpose of the layered file. The presence of layer 304, with the feature point cloud and spatial data, may also allow measurements and 3D renderings of the captured scene to be subsequently calculated. In addition or alternatively to the virtual objects of layer 306, the combination of layer 302 and 304 data may allow for placement and manipulation of different or modified virtual object(s) upon the captured frame. Furthermore, the data may be fed as input into an artificial intelligence (AI) system, to teach it how to better recognize objects, for example by comparing the feature point cloud and spatial information with a feature point cloud calculated by the AI system from the captured image. Other applications may be envisioned that can make use of the layered data format to perform post-capture 3D manipulations, as layer 304 provides the ability to extend the frame captured in layer 302 into a 3D representation.

Figure 4:
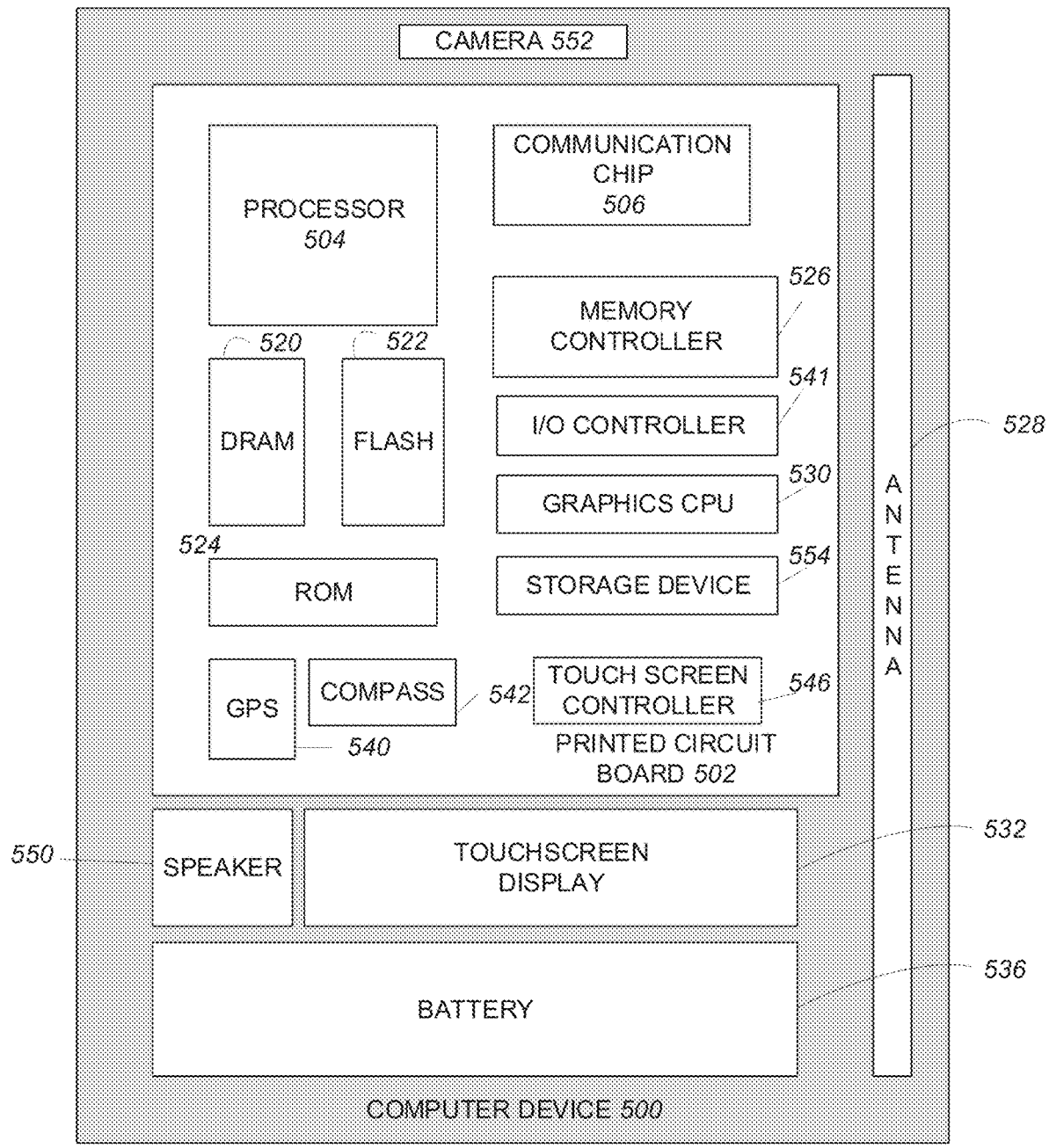
FIG. 4 is a block diagram of an example computer that can be used to implement some or all of the components of the system of FIG. 1.

FIG. 4 illustrates an example computer device 500 that may be employed by the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the system 100 and method 200 described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, smart glasses, or a server. In further implementations, the computer device 500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 5 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) system 100 and method 200. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RE, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method for storing captured augmented reality (AR) images, comprising:
  capturing, with a user device, a video stream, the video stream comprised of a plurality of frames;
  calculating for each frame of the video stream, by the user device, one or more depth points to objects detected in each frame;

inserting into the video stream with reference to the one or more depth points for each frame, at least one AR object;

tagging each frame of the video stream with a unique key;

tagging the one or more depth points calculated for each frame with the same unique key tagged to the frame used to calculate the one or more depth points, that correlates each frame with its one or more depth points; and storing, by the user device, into a layered data structure on a non-transitory medium,
the video stream including the unique key tagged to each frame as a first data type into a first layer,
discrete from the video stream, the one or more depth points including the unique key tagged to each of the one or more depth points correlated to each frame as a second data type into a second layer, and
discrete from the at least one frame and the one or more depth points, the at least one AR object as a third data type into a third layer.

2. The method of claim 1, further comprising editing the at least one AR object.

3. The method of claim 1, further comprising capturing, with the user device, spatial position information of the user device, and wherein calculating the one or more depth points comprises calculating the one or more depth points at least partially with respect to the spatial position information.

4. The method of claim 3, further comprising storing, by the user device, the spatial position information.

5. The method of claim 1, further comprising extracting a plurality of frames from the video stream in sequential order to create a video segment from the video stream, and storing the video segment as the video stream.

6. A non-transitory computer-readable medium (CRM) comprising instructions that, when executed by an apparatus, cause the apparatus to:
capture a video stream, the video stream comprised of a plurality of frames;
calculate, for each of the plurality of frames, one or more depth points to objects detected in each frame;
tag each of the plurality of frames with a unique ID;
tag each of the plurality of frames' corresponding one or more depth points with the same unique ID tagged to the frame used to calculate the one or more depth points, that correlates each of the plurality of frames with its corresponding one or more depth points;
insert, into the video stream with reference to the one or more depth points corresponding to each of the plurality of frames, at least one AR object;
store the video stream, including the unique ID tagged to each of the plurality of frames, in a first layer in a non-transitory file;
store, discrete from the first layer in the file, the one or more depth points, including the unique ID tagged to the one or more depth points corresponding to each of the plurality of frames, in a second layer in the file; and
store, discrete from the first layer and second layer in the file, the at least one AR object in a third layer in the file.

7. The CRM of claim 6, wherein the instructions are to further cause the apparatus to edit the at least one AR object.

8. The CRM of claim 6, wherein the instructions are to further cause the apparatus to capture spatial position information of the user device, and to calculate the one or more depth points at least partially with respect to the spatial position information.

9. The CRM of claim 8, wherein the instructions are to further cause the apparatus to store the spatial position information as part of the one or more depth points in the second layer of the file.

10. The CRM of claim 6, wherein the instructions are to further cause the apparatus to extract a plurality of frames in sequential order to create a video segment from the video stream, and to calculate one or more depth points in each of the plurality of frames of the video segment.

* * * * *